United States Patent
Yagi

(10) Patent No.: US 12,344,788 B2
(45) Date of Patent: Jul. 1, 2025

(54) LIQUID CRYSTAL POLYMER COMPOSITION, LIQUID CRYSTAL POLYMER MOLDED BODY, AND ELECTRICAL AND ELECTRONIC EQUIPMENT

(71) Applicant: OTSUKA CHEMICAL CO., LTD., Osaka (JP)

(72) Inventor: Hiroshi Yagi, Tokushima (JP)

(73) Assignee: OTSUKA CHEMICAL CO., LTD., Osaka (JP)

(*) Notice: Subject to any disclaimer, the term of this patent is extended or adjusted under 35 U.S.C. 154(b) by 0 days.

(21) Appl. No.: 18/031,706

(22) PCT Filed: Oct. 25, 2021

(86) PCT No.: PCT/JP2021/039272
§ 371 (c)(1),
(2) Date: Apr. 13, 2023

(87) PCT Pub. No.: WO2022/092015
PCT Pub. Date: May 5, 2022

(65) Prior Publication Data
US 2023/0383188 A1    Nov. 30, 2023

(30) Foreign Application Priority Data

Oct. 29, 2020   (JP) ................. 2020-181592

(51) Int. Cl.
| | | |
|---|---|---|
| *G02F 1/1333* | (2006.01) | |
| *C08K 3/04* | (2006.01) | |
| *C08K 7/10* | (2006.01) | |
| *C09K 19/38* | (2006.01) | |
| *C09K 19/52* | (2006.01) | |

(52) U.S. Cl.
CPC ............ *C09K 19/52* (2013.01); *C08K 3/04* (2013.01); *C08K 7/10* (2013.01); *C09K 19/3809* (2013.01); *C08K 2201/003* (2013.01); *C09K 2019/521* (2013.01)

(58) Field of Classification Search
CPC .... C09K 19/38; C09K 19/52; C09K 19/3809; C09K 2019/523; C09K 2019/521; G02F 1/1333
See application file for complete search history.

(56) References Cited

U.S. PATENT DOCUMENTS

| | | |
|---|---|---|
| 6,153,121 A | 11/2000 | Makabe et al. |
| 2009/0052025 A1 | 2/2009 | Kitano et al. |
| 2009/0283401 A1 | 11/2009 | Zang et al. |
| 2009/0290208 A1 | 11/2009 | Murata et al. |
| 2011/0089371 A1 | 4/2011 | Murouchi et al. |
| 2011/0114883 A1 | 5/2011 | Murouchi et al. |
| 2014/0011011 A1 | 1/2014 | Fujino et al. |
| 2015/0038631 A1 | 2/2015 | Hamaguchi et al. |
| 2015/0291796 A1 | 10/2015 | Kim |
| 2016/0161804 A1 | 6/2016 | Zhang et al. |
| 2018/0086914 A1 | 3/2018 | Kim |
| 2019/0031838 A1 | 1/2019 | Suzuki et al. |
| 2020/0123420 A1 | 4/2020 | Morioka et al. |
| 2020/0247996 A1 | 8/2020 | Kim |
| 2020/0362099 A1 | 11/2020 | Hara et al. |
| 2022/0098410 A1 | 3/2022 | Kim |
| 2022/0380675 A1 | 12/2022 | Maruo et al. |
| 2023/0383188 A1* | 11/2023 | Yagi ........... C09K 19/52 |
| 2024/0141143 A1* | 5/2024 | Yagi ........... C08L 101/00 |

FOREIGN PATENT DOCUMENTS

| | | |
|---|---|---|
| CN | 101080665 A | 11/2007 |
| CN | 101981123 A | 2/2011 |
| CN | 101981124 A | 2/2011 |
| CN | 103429660 A | 12/2013 |
| CN | 107924039 A | 4/2018 |
| CN | 111073551 A | 4/2020 |
| EP | 2774952 A1 | 9/2014 |
| JP | H4-323262 A | 11/1992 |
| JP | H10-206861 A | 8/1998 |
| JP | 2000-292615 A | 10/2000 |
| JP | 2003-213140 A | 7/2003 |
| JP | 2005-239754 A | 9/2005 |
| JP | 2008-120978 A | 5/2008 |
| JP | 2008-214573 A | 9/2008 |
| JP | 2009-276587 A | 11/2009 |

(Continued)

OTHER PUBLICATIONS

"Subject to." Merriam-Webster.com Dictionary, Merriam-Webster, https://www.merriam-webster.com/dictionary/subject%20to. Accessed Jan. 16, 2025. (Year: 2025).*

Wang et al., "Studies on conductive plastics of reinforced unsaturated polyester", Journal of Ningxia Institute of Technology (Natural Science), 1997, No. 4, vol. 12, pp. 49-51, cited in Mar. 14, 2024. (3 pages).

Office Action dated Mar. 14, 2024, issued in counterpart CN application No. 202180072488.7, with English translation. (14 pages).

International Search Report dated Dec. 14, 2021, issued in counterpart International Application No. PCT/JP2021/039272 (2 pages).

Notification of Transmittal of Translation of the International Preliminary Report on Patentability (Form PCT/IB/338) issued in counterpart International Application No. PCT/JP2021/039272 mailed May 11, 2023 with Forms PCT/IB/373 and PCT/ISA/237. (5 pages).

(Continued)

*Primary Examiner* — Geraldina Visconti
(74) *Attorney, Agent, or Firm* — WHDA, LLP

(57) ABSTRACT

Provided is a liquid crystal polymer composition having excellent light-blocking properties and capable of increasing mechanical strength, such as shock resistance. The liquid crystal polymer composition contains a liquid crystal polymer (A), a particulate carbon material (B), and a reinforcing material (C), wherein the particulate carbon material (B) has a primary particle diameter of not less than 10 nm and not more than 50 nm, and a surface of the reinforcing material (c) is at least partly covered with a treated layer made of a hydrophobic surface treatment agent.

12 Claims, No Drawings

(56) References Cited

FOREIGN PATENT DOCUMENTS

| | | | |
|---|---|---|---|
| JP | 2017-513976 A | 6/2017 | |
| JP | 2020-045501 A | 3/2020 | |
| JP | 2020-186346 A | 11/2020 | |
| TW | 515822 B | 1/2003 | |
| TW | 200643602 A | 12/2006 | |
| TW | 200728415 A | 8/2007 | |
| TW | 201348312 A | 12/2013 | |
| WO | 2013/066003 A1 | 5/2013 | |
| WO | 2017/131018 A1 | 8/2017 | |
| WO | 2019208381 A1 | 10/2019 | |
| WO | 2020/241607 A1 | 12/2020 | |
| WO | 2021/117607 A1 | 6/2021 | |

OTHER PUBLICATIONS

International Search Report dated Jun. 28, 2022, issued in counterpart Application No. PCT/JP2022/016014. (3 pages).

Notification of Transmittal of Translation of the International Preliminary Report on Patentability (Form PCT/IB/338) issued in counterpart International Application No. PCT/JP2022/016014 mailed Oct. 26, 2023 with Forms PCT/IB/373 and PCT/ISA/237. (6 pages).

Non-Final or Final Office Action dated Jul. 31, 2024, issued in U.S. Appl. No. 18/286,600 (17 pages).

Office Action dated Nov. 19, 2024, issued in counterpart to TW Application No. 110139632. (4 pages).

* cited by examiner

LIQUID CRYSTAL POLYMER COMPOSITION, LIQUID CRYSTAL POLYMER MOLDED BODY, AND ELECTRICAL AND ELECTRONIC EQUIPMENT

TECHNICAL FIELD

The present invention relates to liquid crystal polymer compositions, liquid crystal polymer molded bodies using the liquid crystal polymer compositions, and electrical and electronic pieces of equipment using the liquid crystal polymer molded bodies.

BACKGROUND ART

Liquid crystal polymers are used in various components because they are excellent in mechanical strength, moldability, dimensional accuracy, chemical resistance, moisture resistance, electrical properties, and so on. Particularly, because the liquid crystal polymers have excellent thermal resistance and thin-wall moldability in the manufacturing process, use thereof in electronic components of precision equipment and the like, for example, in a camera module, are under consideration.

If, in using a liquid crystal polymer molded body made of a liquid crystal polymer in a camera module, any tiny speck of dirt, dust or like foreign matter adheres to a lens or an image sensor of the camera module, the camera module decreases its optical properties. Therefore, generally, for the purpose of preventing this decrease in optical properties, components for use in the camera module are ultrasonically cleaned prior to the assembly of them to remove tiny specks of dirt, dust or like foreign matter adhering to the surfaces of the components. However, because liquid crystal polymers have high crystalline orientation, it is known that a liquid crystal polymer molded body is likely to cause surface delamination and ultrasonic cleaning thereof brings about a phenomenon of surface delamination and napping (fibrillation). There arises a problem that fibrillated portions of the liquid crystal polymer molded body are likely to produce small powder (particles), which decreases the productivity.

Meanwhile, many pieces of equipment, including smartphones and tablet terminals, incorporate a camera module and, particularly, camera modules including an actuator mechanism, such as an autofocus (AF) mechanism or an optical image stabilizer (OIS) mechanism, are widely prevalent.

In recent years, with advancements in size reduction and thickness reduction of pieces of equipment and their components and increased frequency of carrying the pieces of equipment, the challenge is not only to reduce particles produced during sliding of components for camera module use used in an autofocus (AF) mechanism or an optical image stabilizer (OIS) mechanism with lenses, but also to improve the mechanical strength, such as shock resistance, of the pieces of equipment and their components and reduce particles produced in impact and fall events.

Therefore, for the purpose of preventing adhesion of specks of dirt and dust in the air to the components for camera module use while ensuring the light-blocking properties of the components, it has been required to give a liquid crystal polymer jet-blackness and mechanical strength, particularly such as shock resistance, thus giving it the function of reducing particles that may be produced in impact and fall events. Generally, in order to give resin a functionality, such as jet-blackness or antistatic properties, resin is used with the addition of a particulate carbon material, such as carbon black or carbon nanotube. However, the structure of these particulate carbon materials is very complicated and, quite simply, the particulate carbon materials exist in the form of agglomerates. Therefore, it is known that, in melt-kneading such a particulate carbon material into the liquid crystal polymer, the agglomerates are suspended in a low-viscosity, melted resin, thus having difficulty being subjected to shear during melt-kneading and particularly having difficulty being dispersed. As a result, in the event of a dispersion failure, stress is focused on the agglomerates and the agglomerates may be the origin of fracture, which may significantly deteriorate the mechanical strength of the liquid crystal polymer and make it difficult to achieve the original purpose. For example, as for carbon black, condensed benzene rings are arranged as crystallites called a pseudographite structure, the crystallites assemble to form primary particles, the primary particles fuse to form aggregate structures, and agglomerates exist as structures in which the aggregate structures are bound by the van der Waals attraction.

For example, Patent Literature 1 discloses an invention relating to an antistatic resin molded product obtained by molding an electrically conductive thermoplastic resin composition containing an electrically conductive resin component made of a thermoplastic resin and carbon microfibers with a predetermined average fiber diameter or less.

CITATION LIST

Patent Literature

Patent Literature 1: JP-A-2003-213140

SUMMARY OF INVENTION

Technical Problem

However, Patent Literature 1 does not disclose any means for giving jet-blackness or antistatic properties to a liquid crystal polymer for the purposes of preventing adhesion of specks of dirt and dust in the air to the liquid crystal polymer, preventing adhesion of components to a molding tool during molding or ensuring the light-blocking properties of molded products, such as components for camera module use. Particularly, the literature does not disclose any means for giving mechanical strength, such as shock resistance, to reduce particles that may be produced in impact and fall events.

The present invention is aimed at solving the above problem and, therefore, has an object of providing a liquid crystal polymer composition having excellent light-blocking properties and capable of increasing mechanical strength, particularly such as shock resistance, a liquid crystal polymer molded body using the liquid crystal polymer composition, and electrical and electronic equipment using the liquid crystal polymer molded body.

Solution to Problem

The inventors conducted intensive studies to solve the above problem, thus found that when a liquid crystal polymer composition contains a liquid crystal polymer (A), a particulate carbon material (B), and a reinforcing material (C), primary particles of the particulate carbon material (B) have a diameter of not less than 10 nm and not more than 50 nm, and a surface of the reinforcing material (C) is at least partly covered with a treated layer made of a hydrophobic surface treatment agent, it can achieve excellent light-blocking properties and an excellent effect in mechanical strength, particularly, shock resistance, which a resin molded product containing a particulate carbon material, such as carbon black, tends to lack, and completed the present invention. Specifically, the gist of the present invention is as follows.

Aspect 1: A liquid crystal polymer composition containing a liquid crystal polymer (A), a particulate carbon material (B), and a reinforcing material (C), wherein the particulate carbon material (B) has a primary particle diameter of not less than 10 nm and not more than 50 nm, and a surface of the reinforcing material (c) is at least partly covered with a treated layer made of a hydrophobic surface treatment agent.

Aspect 2: The liquid crystal polymer composition according to aspect 1, being alkoxysilane represented by the general formula (I) below:

$$R^1{}_n Si(OR^2)_{4-n} \qquad \text{Formula(I)}$$

wherein in the general formula (I) n represents an arbitrary integer selected from 1 to 3, $R^1$ represents an alkyl group, an alkenyl group or an aryl group, and $R^2$ represents an alkyl group.

Aspect 3: The liquid crystal polymer composition according to aspect 1 or 2, wherein the reinforcing material (C) has an average fiber length of 1 μm to 300 μm.

Aspect 4: The liquid crystal polymer composition according to any one of aspects 1 to 3, wherein the reinforcing material (C) is at least one type of fibers selected from potassium titanate fibers and wollastonite fibers.

Aspect 5: The liquid crystal polymer composition according to any one of aspects 1 to 4, wherein the particulate carbon material (B) is at least one of carbon black and carbon nanotube.

Aspect 6: The liquid crystal polymer composition according to any one of aspects 1 to 5, wherein a mass ratio of the particulate carbon material (B) to the reinforcing material (C) (particulate carbon material (B)/reinforcing material (C)) is 1/400 to 10.

Aspect 7: The liquid crystal polymer composition according to any one of aspects 1 to 6, wherein the liquid crystal polymer (A) is liquid crystal polyester.

Aspect 8: The liquid crystal polymer composition according to any one of aspects 1 to 7, being used in a camera module.

Aspect 9: A liquid crystal polymer molded body being a molded body of the liquid crystal polymer composition according to any one of aspects 1 to 8.

Aspect 10: The liquid crystal polymer molded body according to aspect 9, being a component for a camera module.

Aspect 11: Electrical and electronic equipment including the liquid crystal polymer molded body according to aspect 9 or 10 and having a camera function.

Aspect 12: The electrical and electronic equipment according to aspect 11, being a smartphone or a tablet terminal each having the camera function.

Advantageous Effects of Invention

The present invention enables provision of a liquid crystal polymer composition having excellent light-blocking properties and capable of increasing mechanical strength, such as shock resistance, a liquid crystal polymer molded body using the liquid crystal polymer composition, and electrical and electronic equipment using the liquid crystal polymer molded body.

DESCRIPTION OF EMBODIMENTS

Hereinafter, a description will be given of examples of a preferred embodiment for working of the present invention. However, the following embodiment is simply illustrative. The present invention is not at all limited by the following embodiment.

<Liquid Crystal Polymer Composition>

A liquid crystal polymer composition according to the present invention contains a liquid crystal polymer (A), a particulate carbon material (B), and a reinforcing material (C) and may further contain, if necessary, barium sulfate (D), a solid lubricant, and other additives.

A description will be given below of components and so on of the liquid crystal polymer composition according to the present invention.

<Essential Components of Liquid Crystal Polymer Composition>

(Liquid Crystal Polymer (A))

The liquid crystal polymer composition according to the present invention contains a liquid crystal polymer (A) (hereinafter, referred to also as the "component (A)"). The liquid crystal polymer (A) refers to a melt-processable polymer having a property capable of forming an optically anisotropic molten phase. The optically anisotropic molten phase can be confirmed by normal ellipsometry using an orthogonal polarizer. The liquid crystal polymer (A) has an elongated molecular shape and has a flat molecular chain having high rigidity along the long chain (wherein the molecular chain is referred to as a "mesogenic group"). The liquid crystal polymer (A) may have a mesogenic group in one or both of a polymer main chain and a polymer side chain. However, when a resulting liquid crystal polymer molded body requires higher thermal resistance, the preferred liquid crystal polymer (A) is one in which the polymer main chain contains a mesogenic group.

Examples of the component (A) include liquid crystal polyester, liquid crystal polyester amide, liquid crystal polyester ether, liquid crystal polyester carbonate, liquid crystal polyester imide, and liquid crystal polyamide. Among these liquid crystal polymers, from the viewpoint of obtaining a liquid crystal polymer molded body having higher strength, liquid crystal polyester, liquid crystal polyester amide or liquid crystal polyamide is preferred. From the viewpoint of obtaining lower water-absorption liquid crystal polymer molded body, liquid crystal polyester or liquid crystal amide is preferred and liquid crystal polyester is more preferred. More specifically, examples include liquid crystal polymers (A1) to (A6) below. A liquid crystal polymer selected from them may be used singly or a combination of two or more of them may be used as the component (A).

Examples include liquid crystal polymers, such as:
(A1) liquid crystal polyester composed of repeating units represented by Formula (1);
(A2) liquid crystal polyester composed of repeating units represented by Formula (2) and repeating units represented by Formula (3);
(A3) liquid crystal polyester composed of repeating units represented by Formula (1), repeating units represented by Formula (2), and repeating units represented by Formula (3);
(A4) liquid crystal polyester amide or liquid crystal polyamide in which some or all of the repeating units represented by Formula (1) in (A1) are substituted with repeating units represented by Formula (4);

(A5) liquid crystal polyester amide or liquid crystal polyamide in which some or all of the repeating units represented by Formula (3) in (A2) are substituted with repeating units represented by Formula (5) and/or repeating units represented by Formula (6); and (A6) liquid crystal polyester amide in which some or all of the repeating units represented by Formula (3) in (A3) are substituted with repeating units represented by Formula (5) and/or repeating units represented by Formula (6). A liquid crystal polymer selected from these liquid crystal polymers may be used singly or a combination of two or more of them may be used as the liquid crystal polymer (A).

[Chem. 1]

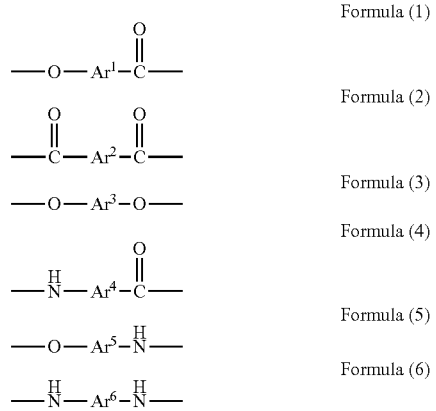

Formula (1)
Formula (2)
Formula (3)
Formula (4)
Formula (5)
Formula (6)

In the formulae, $Ar^1$ and $Ar^4$ each independently represent a 1,4-phenylene group, a 2,6-naphthalenediyl group or a 4,4-biphenylene group, $Ar^2$, $Ar^3$, $Ar^5$, and $Ar^6$ each independently represent a 1,4-phenylene group, a 2,6-naphthalenediyl group, a 1,3-phenylene group or a 4,4-biphenylene group, and regarding $Ar^1$, $Ar^2$, $Ar^3$, $Ar^4$, $Ar^5$, and $Ar^6$, some or all of the hydrogen atoms on the aromatic ring may be substituted with halogen atoms, alkyl groups or aryl groups.

The repeating units represented by Formula (1) are repeating units derived from an aromatic hydroxycarboxylic acid. Examples of the aromatic hydroxycarboxylic acid include 4-hydroxybenzoic acid, 3-hydroxybenzoic acid, 6-hydroxy-2-naphthoic acid, 7-hydroxy-2-naphthoic acid, 6-hydroxy-1-naphthoic acid, 4-hydroxybiphenyl-4-carboxylic acid, and aromatic hydroxycarboxylic acids in which some or all of the hydrogens on the aromatic ring in each of the above aromatic hydroxycarboxylic acids are substituted with alkyl groups, aryl groups or halogen atoms.

The repeating units represented by Formula (2) are repeating units derived from an aromatic dicarboxylic acid. Examples of the aromatic dicarboxylic acid include terephthalic acid, phthalic acid, 2,4-diphenyldicarboxylic acid, 2,6-naphthalenedicarboxylic acid, isophthalic acid, and aromatic dicarboxylic acids in which some or all of the hydrogens on the aromatic ring in each of the above aromatic dicarboxylic acids are substituted with alkyl groups, aryl groups or halogen atoms.

The repeating units represented by Formula (3) are repeating units derived from an aromatic diol. Examples of the aromatic diol include hydroquinone, resorcin, naphthalene-2,6-diol, 4,4-biphenylenediol, 3,3-biphenylenediol, 4,4-dihydroxydiphenyl ether, 4,4-dihydroxydiphenyl sulfone, and aromatic diols in which some or all of the hydrogens on the aromatic ring in each of the above aromatic diols are substituted with alkyl groups, aryl groups or halogen atoms.

The repeating units represented by Formula (4) are repeating units derived from an aromatic aminocarboxylic acid. Examples of the aromatic aminocarboxylic acid include 4-aminobenzoic acid, 3-aminobenzoic acid, 6-amino-2-naphthoic acid, and aromatic aminocarboxylic acids in which some or all of the hydrogens on the aromatic ring in each of the above aromatic aminocarboxylic acids are substituted with alkyl groups, aryl groups or halogen atoms.

The repeating units represented by Formula (5) are repeating units derived from an aromatic amine having a hydroxy group and examples include 4-aminophenol, 3-aminophenol, 4-amino-1-naphthol, 4-amino-4-hydroxydiphenyl, and aromatic hydroxyamines in which some or all of the hydrogens on the aromatic ring in each of the above aromatic amines with a hydroxy group are substituted with alkyl groups, aryl groups or halogen atoms.

The repeating units represented by Formula (6) are structural units derived from an aromatic diamine and examples include 1,4-phenylenediamine, 1,3-phenylenediamine, and aromatic diamines in which some or all of the hydrogens on the aromatic ring in each of the above aromatic diamines are substituted with alkyl groups, aryl groups or halogen atoms.

Examples of the alkyl group listed as an example of the substituents having the above structural units include linear, branched or alicyclic alkyl groups having 1 to 10 carbon atoms, including a methyl group, an ethyl group, a propyl group, an isopropyl group, a butyl group, a tert-butyl group, a hexyl group, a cyclohexyl group, an octyl group, and a decyl group. Examples of the aryl group include aryl groups having 6 to 10 carbon atoms, including a phenyl group and a naphthyl group. Examples of the halogen atom include a fluorine atom, chlorine atom, a bromine atom, and an iodine atom.

Among the components (A), in view of providing a liquid crystal polymer molded body having higher thermal resistance and higher dimensional stability, at least one liquid crystal polyester selected from the group consisting of (A1) to (A3) is preferred and liquid crystal polyester (A1) or (A3) is particularly preferred.

Preferred among the components (A) are liquid crystal polymers in which the melt viscosity at a shear rate of $1.0 \times 10^3$ sec$^{-1}$ as measured at a melt temperature 20° C. to 40° C. higher than the melting point with a capillary rheometer is $1.0 \times 10^3$ mPa·s to $1.0 \times 10^5$ mPa·s. For example, depending on the thermal deformation temperature, liquid crystal polymers having a deflection temperature of 260° C. or higher under load are referred to as a type I and liquid crystal polymers having a deflection temperature of not lower than 210° C. and lower than 260° C. under load are referred to as a type II. The liquid crystal polymers of type I are measured at a temperature 30° C. higher than the melting point and the liquid crystal polymers of type II are measured at a temperature 40° C. higher than the melting point.

The form of the component (A) is not particularly limited so long as it can be melt-kneaded. For example, any one of powdered, granular, and pelletized forms can be used.

The content of the component (A) in the liquid crystal polymer composition according to the present invention is, in a total amount of 100% by mass of the liquid crystal polymer composition, preferably 40% by mass to 98% by mass, more preferably 60% by mass to 94% by mass, and still more preferably 70% by mass to 90% by mass.

(Particulate Carbon Material (B))

The type of the particulate carbon material (B) (hereinafter, referred to also as the "component (B)") in the liquid crystal polymer composition according to the present invention is not particularly limited. For example, commonly available particulate carbon materials for use for the purpose of ensuring the light-blocking properties of a liquid crystal polymer molded body, such as a component for camera module use, and for use in coloring resin can be preferably used.

Examples of the particulate carbon material (B) that can be used include carbon blacks, such as graphite, acetylene black, furnace black, lamp black, thermal black, channel black, roller black, and disc black; carbon nanotube; and carbon fibril. From the viewpoint of further increasing the light-blocking properties of the liquid crystal polymer molded body molded from the liquid crystal polymer composition according to the present invention, the particulate carbon material (B) is preferably carbon black. These types of particulate carbon materials (B) may be used singly or in combination of two or more of them.

In the present invention, the primary particle diameter of the particulate carbon material (B) is not less than 10 nm and not more than 50 nm.

When the primary particle diameter of the particulate carbon material (B) is not less than 10 nm and not more than 50 nm, the particulate carbon material (B) can be easily dispersed into the liquid crystal polymer composition in producing a liquid crystal polymer composition according to the present invention or a liquid crystal polymer molded body molded from the liquid crystal polymer composition according to the present invention. In addition, the liquid crystal polymer molded body molded from the liquid crystal polymer composition according to the present invention can be given a sufficiently low surface resistance, which enables the increase in the amount of electric charge in the liquid crystal polymer molded body to be reduced. In the liquid crystal polymer molded body obtained in the above manner, the in-plane surface resistance of the liquid crystal polymer molded body can be easily made uniform. As a result, the increase in amount of electric charge can be reduced everywhere in the plane of the liquid crystal polymer molded body. The primary particle diameter of the particulate carbon material (B) is preferably not less than 15 nm and not more than 45 nm, and more preferably not less than 20 nm and not more than 45 nm.

In the present invention, an arithmetic average particle diameter (number average), which is an average value of primary particle diameters measured by a transmission electron microscope, can be adopted as the primary particle diameter of the particulate carbon material (B).

In the present invention, the DBP oil absorption of the particulate carbon material (B) is preferably not less than 90 cm$^3$/100 g and not more than 550 cm$^3$/100 g.

A higher DBP oil absorption of the particulate carbon material (B) means a larger number of voids in the vicinity of the surfaces of the particulate carbon material (B). When the number of voids in the vicinity of the surfaces of the particulate carbon material (B) is large, particles of the particulate carbon material (B) are likely to be engaged with and connected to each other in the liquid crystal polymer composition.

When the DBP oil absorption of the particulate carbon material (B) is not less than 90 cm$^3$/100 g, the liquid crystal polymer molded body molded from the liquid crystal polymer composition is likely to sufficiently conduct electricity at the connected portions of the particulate carbon material (B). As a result, the surface resistance of the molded body can be more sufficiently lowered. Hence, the increase in the amount of electric charge in the molded body can be more sufficiently reduced. However, if the DBP oil absorption of the particulate carbon material (B) is excessively high, the number of voids in the vicinity of the surfaces of the particulate carbon material (B) is excessively large, which makes it likely that particles of the particulate carbon material (B) are strongly engaged with each other in the liquid crystal polymer composition. In melt-kneading the liquid crystal polymer (A), the particulate carbon material (B), the reinforcing material (C), and additives to be added if desired, the melt viscosity of the mixture of them may become high. As a result, the mixture may be difficult to knead, which makes it difficult to produce the liquid crystal polymer composition. When the DBP oil absorption of the particulate carbon material (B) is not more than 550 cm$^3$/100 g, a mixture of the liquid crystal polymer (A), the particulate carbon material (B), the reinforcing material (C), and additives to be added if desired can be prevented from reaching an excessively high viscosity in melt-kneading the mixture. As a result, the mixture can be easily granulated, which makes it easier to produce the liquid crystal polymer composition according to the present invention. The DBP oil absorption of the particulate carbon material (B) is preferably not less than 90 cm$^3$/100 g, more preferably 92 cm$^3$/100 g, preferably not more than 550 cm$^3$/100 g, and more preferably not more than 525 cm$^3$/100 g.

In the present invention, the value obtained by measurement in conformity with JIS K 6221 using a dibutyl phthalate absorbed meter is adopted as the DBP oil absorption.

In the present invention, the BET specific surface area of the particulate carbon material (B) is preferably not less than 75 m$^2$/g and not more than 1500 m$^2$/g, more preferably not less than 95 m$^2$/g and not more than 1350 m$^2$/g, and still more preferably not less than 100 m$^2$/g and not more than 1300 m$^2$/g.

In the present invention, the value adopted as the BET specific surface area is the value obtained by using a BET specific surface area measuring instrument to adsorb nitrogen gas thereon at the liquid nitrogen temperature and measure the amount of nitrogen gas adsorbed, and calculating, by the BET method, the BET specific surface area from the amount of nitrogen gas adsorbed. An example of the BET specific surface area measuring instrument that can be used is "AccuSorb 2100E" manufactured by Micromeritics Instrument Corporation.

When the BET specific surface area of the particulate carbon material (B) is the above lower limit or more, the liquid crystal polymer molded body molded from the liquid crystal polymer composition according to the present invention is likely to sufficiently conduct electricity at the connected portions of the particulate carbon material (B). As a result, the surface resistance of the liquid crystal polymer molded body can be further lowered. Hence, the increase in the amount of electric charge in the molded product can be further reduced.

When, in producing the liquid crystal polymer composition or molded product according to the present invention, the BET specific surface area of the particulate carbon material (B) is the above upper limit or less, a mixture of the liquid crystal polymer (A), the particulate carbon material (B), the reinforcing material (C), and additives to be added if desired can be prevented from reaching an excessively high melt viscosity in melt-kneading the mixture. As a result, the mixture can be more easily kneaded, which makes it easier to produce the liquid crystal polymer composition according to the present invention.

The content of the component (B) in the liquid crystal polymer composition according to the present invention is, in a total amount of 100% by mass of the liquid crystal polymer composition, preferably in a range of 0.1% by mass to 5.0% by mass, more preferably 1.0% by mass to 4.5% by mass, and still more preferably 2.0% by mass to 4.0% by mass. If the content of the component (B) is excessively low, the resulting liquid crystal polymer composition may be low in jet-blackness and, therefore, may not be able to sufficiently ensure the light-blocking properties.

If the content of the component (B) is excessively high, agglomerates (agglomerated bunches of small protrusions of the particulate carbon material (B)) are suspended in a resin made of a melted, low-viscosity liquid crystal polymer during melt-kneading, which makes the liquid crystal polymer composition difficult to be subjected to shear during kneading and makes it likely that a dispersion failure occurs. Therefore, stress is focused on the agglomerates and the agglomerates may be the origin of fracture, which may significantly deteriorate the mechanical strength of the liquid crystal polymer molded body and make it difficult to achieve the original purpose.

When the content of the component (B) is in the range of 0.1% by mass to 5.0% by mass, the dispersibility of the liquid crystal polymer composition can be increased and, thus, the resulting liquid crystal polymer molded body can be further increased in thermal resistance and mechanical strength, particularly, shock resistance properties.

When the reinforcing material (C) is wollastonite fibers to be described hereinafter, the content of the component (B) in the liquid crystal polymer composition according to the present invention is, in a total amount of 100% by mass of the liquid crystal polymer composition, preferably in a range of 0.1% by mass to 5.0% by mass, more preferably 1.0% by mass to 4.5% by mass, and still more preferably 2.5% by mass to 4.0% by mass. In this case, the dynamic coefficient of friction and/or static coefficient of friction of the resulting liquid crystal polymer molded body can be further lowered.

When the reinforcing material (C) is potassium titanate fibers to be described hereinafter, the content of the component (B) in the liquid crystal polymer composition according to the present invention is, in a total amount of 100% by mass of the liquid crystal polymer composition, preferably in a range of 0.1% by mass to 5.0% by mass, more preferably 1.0% by mass to 4.5% by mass, and still more preferably 1.5% by mass to 4.0% by mass. In this case, the dynamic coefficient of friction and/or static coefficient of friction of the resulting liquid crystal polymer molded body can be further lowered.

(Reinforcing Material (C))

The liquid crystal polymer composition according to the present invention contains a reinforcing material (hereinafter, referred to also as the "component (C)"). Examples of the component (C) include fibrous reinforcing materials and platy reinforcing materials and the preferred reinforcing materials are fibrous reinforcing materials. Examples of the fibrous reinforcing materials include: inorganic fibers, such as carbon fibers, glass fibers, potassium titanate fibers, wollastonite fibers, aluminum borate, magnesium borate, xonotlite, zinc oxide, basic magnesium sulfate, alumina fibers, silicon carbide fibers, and boron fibers; and organic fibers, such as aramid fibers and polyphenylene benzoxazole (PBO) fibers. The inorganic fibers are preferably used. These types of reinforcing materials (C) may be used singly or in combination of two or more of them.

The component (C) is preferably in powdered form consisting of fibrous particles. From the viewpoint of further reducing the production of particles, the average fiber length is preferably 1 µm to 300 µm, more preferably 1 µm to 200 µm, still more preferably 3 µinto 100 µm, and particularly preferably 5 µm to 50 µm. The average aspect ratio is preferably 3 to 200, more preferably 3 to 100, still more preferably 3 to 50, and particularly preferably 3 to 40.

Fibrous particles as used in the present invention refer to particles having an L/B of 3 or more and an L/T of 3 or more where the dimension of the longest side of, among cuboids (circumscribing cuboids) circumscribing the particle, a cuboid having the minimum volume is defined as a length L, the dimension of the second longest side of the cuboid is defined as a breadth B, and the dimension of the shortest side of the cuboid is defined as a thickness T (i.e., B>T). The length L and the breadth B correspond to the fiber length and the fiber diameter, respectively.

The component (C) preferably has a Mohs hardness of 5 or less from the viewpoint of further increasing the sliding properties of the liquid crystal polymer molded body and examples include potassium titanate fibers, wollastonite fibers, aluminum borate, magnesium borate, xonotlite, zinc oxide, and basic magnesium sulfate. From the viewpoint of further increasing the mechanical strength, the component (C) is preferably at least one type of fibers of potassium titanate fibers and wollastonite fibers. The Mohs hardness is an index indicating the hardness of substances, wherein when two different minerals are rubbed against each other, scratched one of them is a substance having a lower hardness.

Heretofore known potassium titanate fibers can be widely used and examples include potassium tetratitanate fibers, potassium hexatitanate fibers, and potassium octatitanate fibers. The dimensions of the potassium titanate fibers are not particularly limited so long as they are in the above-described ranges, but the average fiber length is preferably 1 µm to 50 µm, more preferably 3 µm to 30 µm, and still more preferably 3 µm to 20 µm. The average fiber diameter is preferably 0.01 µm to 1 µm, more preferably 0.05 µm to 0.8 µm, and still more preferably 0.1 µm to 0.7 µm. The average aspect ratio is preferably 10 or more, more preferably 10 to 100, and still more preferably 15 to 35. Even marketed products can be used for these fibrous reinforcing materials and examples that can be used include "TISMO D" (average fiber length: 15 µm, average fiber diameter: 0.5 µm) and "TISMO N" (average fiber length: 15 µm, average fiber diameter: 0.5 µm) both manufactured by Otsuka Chemical Co., Ltd.

Wollastonite fibers are inorganic fibers made of calcium metasilicate. The dimensions of the wollastonite fibers are not particularly limited so long as they are in the above-described ranges of the fibrous reinforcing materials, but the average fiber length is preferably 5 µm to 180 µm, more preferably 10 µinto 100 µm, and still more preferably 20 µinto 40 µm. The average fiber diameter is preferably 0.1 µm to 15 µm, more preferably 1 lam to 10 µm, and still more preferably 2 lam to 7 µm. The average aspect ratio is preferably 3 or more, more preferably 3 to 30, and still more preferably 3 to 15. Even marketed products can be used for these fibrous reinforcing materials and an example that can be used is "Bistal W" (average fiber length: 25 µm, average fiber diameter: 3 µm) manufactured by Otsuka Chemical Co., Ltd.

The above average fiber length and average fiber diameter can be measured by observation with a scanning electron microscope, and the average aspect ratio ((average fiber length)/(average fiber diameter)) can be calculated from the average fiber length and the average fiber diameter. For example, a plurality of fibers of the fibrous reinforcing material are taken with a scanning electron microscope, the images of 300 fibers of the fibrous reinforcing material are arbitrarily selected from the observed images of the plurality of fibers, and their fiber lengths and fiber diameters are measured. The average fiber length can be determined by dividing the sum of all the measured fiber lengths by the number of fibers, and the average fiber diameter can be determined by dividing the sum of all the measured fiber diameters by the number of fibers.

In order to increase the wettability with the components (A) and (B) and further improve jet-blackness and physical properties, such as mechanical strength, of an obtained liquid crystal polymer molded body, a treated layer made of a surface treatment agent is formed on the surface of the component (C).

More specifically, the component (C) is preferably a reinforcing material in which the surface is at least partly covered with a treated layer made of a hydrophobic surface treatment agent. The treated layer preferably covers 50% or more of the surface of the reinforcing material and more preferably covers 80% or more of the surface of the reinforcing material. However, the treated layer particularly preferably covers the entire surface of the reinforcing material.

Examples of the hydrophobic surface treatment agent include silane coupling agents, titanium coupling agents, and aluminate-based coupling agents. Among them, silane coupling agents are preferred and hydrophobic alkylsilane coupling agents are more preferably used.

The hydrophobic silane coupling agent can be any silane coupling agent having: an intrinsically hydrophobic functional group, such as an alkyl group or an aryl group; and a hydrolyzable functional group capable of generating a group reactable with a hydrophilic group in the surface of the reinforcing material. Typical examples of such a hydrophobic alkylsilane coupling agent include alkoxysilanes represented by the general formula (I).

  Formula(I)

In the general formula (I), n represents an arbitrary integer selected from 1 to 3, $R^1$ represents an alkyl group, an alkenyl group or an aryl group, and these groups may have a substituent. In the presence of a plurality of $R^1$s, they may be of the same type or different types. $R^2$ represents an alkyl group and may have a substituent. In the presence of a plurality of Res, they may be of the same type or different types.

Examples of the alkyl group represented by $R^1$ include a heptyl group, an octyl group, a nonyl group, a decyl group, a dodecyl group, a hexadecyl group, an octadecyl group, and an icosyl group. From the viewpoint of further increasing the shock resistance of the resulting liquid crystal polymer molded body, the number of carbon atoms of the alkyl group is preferably 8 or more, and more preferably 10 or more. From the viewpoint of further lowering the dynamic coefficient of friction or static coefficient of friction of the resulting liquid crystal polymer molded body, the number of carbon atoms of the alkyl group is still more preferably 12 or more, and particularly preferably 14 or more. The upper limit of the number of carbon atoms of the alkyl group is not particularly limited, but can be, for example, not more than 20.

These alkyl groups may have a ring structure or a branched structure and, generally, an alkyl group having a larger number of carbon atoms in the straight chain tends to have a higher degree of hydrophobicity. These alkyl groups may have one to four (preferably one to three and more preferably one) substituents to be described hereinafter at any position.

Example of the alkenyl group represented by $R^1$ include a vinyl group and a butenyl group. These alkenyl groups may have a ring structure or a branched structure. These alkenyl groups may have one to four (preferably one to three and more preferably one) substituents to be described hereinafter at any position.

Example of the aryl group represented by $R^1$ include a phenyl group and a naphthyl group. These aryl groups may have one to four (preferably one to three and more preferably one) substituents to be described hereinafter at any position.

Each of the above-listed groups represented by $R^1$ may have a substituent unless its hydrophobicity is inhibited. Examples of the substituent include hydrophobic substituents, such as a fluorine atom and a (meth)acryloxy group.

Furthermore, the above alkyl group may have as the hydrophobic substituent any of the above-listed aryl groups and the above aryl group may have an alkyl group as the hydrophobic substituent.

Examples of the alkyl group represented by $R^2$ include a methyl group, an ethyl group, a propyl group, a butyl group, a pentyl group, a hexyl group, a heptyl group, an octyl group, a nonyl group, a decyl group, a dodecyl group, a hexadecyl group, an octadecyl group, and an icosyl group. An alkoxy group ($OR^2$) in alkoxysilane represented by the general formula (1) is a hydrolyzable group. Therefore, in terms of hydrolyzability, $R^2$ is preferably a lower alkyl group with 4 or less carbon atoms, more preferably an ethyl group or a methyl group, and most preferably a methyl group. The reference character n represents an arbitrary integer selected from 1 to 3 and n is preferably 1 in terms of the reactivity with the particle surfaces of the reinforcing material and the hydrophobicity.

Specific examples of alkoxysilane described above include methyltrimethoxysilane, ethyltrimethoxysilane, hexyltrimethoxysilane, heptyltrimethoxysilane, octyltrimethoxysilane, nonyltrimethoxysilane, decyltrimethoxysilane, dodecyltrimethoxysilane, hexadecyltrimethoxysilane, octadecyltrimethoxysilane, icosyltrimethoxysilane, phenyltrimethoxysilane, methyltriethoxysilane, ethyltriethoxysilane, hexyltriethoxysilane, heptyltriethoxysilane, octyltriethoxysilane, nonyltriethoxysilane, decyltriethoxysilane, dodecyltriethoxysilane, hexadecyltriethoxysilane, octadecyltriethoxysilane, icosyltriethoxysilane, and phenyltriethoxysilane. These alkoxysilanes can be used singly or in combination of two or more of them.

In the present invention, the degree of hydrophobicity of the surface treatment agent can be expressed by treating the surface of a glass plate with the surface treatment agent and determining the surface free energy of the treated surface. In the present invention, the surface free energy can be determined by uniformly applying to the glass plate a surface treatment agent diluted 10 times with methanol, heating the glass plate at 85° C. for an hour, then subjecting the glass plate to a heat treatment at 110° C. for an hour, then measuring the static contact angles of two liquids, water and decane, on the glass plate surface to which the surface treatment agent is applied, and calculating the surface free energy from the static contact angles. For example, the surface free energy of decyltrimethoxysilane is 28 mN/m, the surface free energy of γ-glycidoxypropyltrimethoxysilane is 55 mN/m, and the surface free energy of 3-aminopropyltriethoxysilane is 68 mN/m.

The type of the surface treatment agent for use in the present invention is not particularly limited, but the preferred surface treatment agents are those having good thermal stability in terms of temperature during molding process of the liquid crystal polymer, having physical and chemical stabilities, and having a surface free energy of 50 mN/m or less when a glass plate is uniformly treated with them. The lower limit of the surface free energy is not particularly limited, but is preferably 1 mN/m. Even with the use of any surface treatment agent having a surface free energy of over 50 mN/m, the surface free energy may be brought down to 50 mN/m or less by mixing two or more types of surface treatment agents.

If the surface free energy of the surface treatment agent is over 50 mN/m, it is higher than that of the liquid crystal polymer (A), which may make it impossible to control metal ions eluted, because of failure of the reinforcing material (C) during kneading or molding process, from the failure surface and accelerate hydrolysis of the liquid crystal polymer. Therefore, the liquid crystal polymer (A) is preferably filled with a reinforcing material (C) prepared to have a surface free energy in a range of 50 mN/m or less.

Furthermore, the oil absorption of the reinforcing material (C) after being subjected to surface treatment is preferably 130 ml/100 g or less, and more preferably 80 ml/100 g to 130 ml/100 g.

If the oil absorption is over 130 ml/100 g, the compatibility of the reinforcing material (C) with the liquid crystal polymer (A) extremely decreases, which may cause a problem that the productivity significantly decreases and also a problem that the amount of filling of surface-treated reinforcing material (C) cannot be increased.

The oil absorption of the reinforcing material (C) after being surface-treated with a surface treatment agent can be measured using the refined linseed oil method [JIS K 5101-13-1].

In relation to a method for subjecting the reinforcing material (C) to surface treatment in the present invention, there are known a dry method and a wet method as a method for previously treating the surfaces of the reinforcing material (C) with a coupling agent and both the methods can be used in the present invention. In doing so, the concentration of the surface treatment is suitably about 0.1% by mass to 3.0% by mass and preferably about 0.5% by mass to 1.5% by mass relative to the reinforcing material (C).

Known surface treatment methods can be used as the method for forming treated layers made of a surface treatment agent on the surfaces of the component (C) and an example is a dry method of loading the reinforcing material into a high-speed stirring apparatus, such as a Henschel mixer, and spraying on the reinforcing material being stirred the surface treatment agent (in liquid form) or a solution obtained by dissolving the surface treatment agent in a solvent promoting hydrolysis (for example, water, an alcohol or a mixed solvent of them).

In treating the surfaces of the reinforcing material (C) for use in the present invention with the surface treatment agent, the amount of surface treatment agent is not particularly limited, but, in the dry method, the solution of the surface treatment agent may be sprayed so that the amount of surface treatment agent reaches, relative to 100 parts by mass of the reinforcing material (C), for example, 0.1 parts by mass to 20 parts by mass, preferably 0.1 parts by mass to 10 parts by mass, more preferably 0.3 parts by mass to 5 parts by mass, still more preferably 0.5 parts by mass to 3 parts by mass, and most preferably 0.8 parts by mass to 1.2 parts by mass.

By defining the amount of surface treatment agent within the above ranges, the adhesion of the reinforcing material (C) to the components (A) and (B) can be further increased and the dispersibility of the reinforcing material (C) can be further increased.

The content of the component (C) in the liquid crystal polymer composition according to the present invention is, in a total amount of 100% by mass of the liquid crystal polymer composition, preferably 0.5% by mass to 40% by mass, more preferably 5% by mass to 25% by mass, and still more preferably 10% by mass to 25% by mass.

By defining the content of the component (C) within the range of 0.5% by mass to 40% by mass, the thermal resistance and mechanical strength, particularly shock resistance properties, can be further increased.

In the liquid crystal polymer composition according to the present invention, the mass ratio between the component (B) and the component (C) (i.e., (B):(C) or (particulate carbon material (B))/(reinforcing material (C))) is preferably 0.1:40 to 5:0.5 (1/400 to 10), more preferably 0.5:25 to 5:5 (1/50 to 1), and still more preferably 2:25 to 4:10 (2/25 to 2/5). By defining the mass ratio between the component (B) and the component (C) within the range of 0.1:40 to 5:0.5 (1/400 to 10), the jet-blackness, electrical conductivity, thermal resistance, and mechanical strength, particularly shock resistance properties, can be further increased.

Since the liquid crystal polymer composition according to the present invention contains the above-described liquid crystal polymer (A), particulate carbon material (B), and reinforcing material (C), it has excellent light-blocking properties and its mechanical strength, particularly such as shock resistance, can be increased.

<Optional Components of Liquid Crystal Polymer Composition>

(Barium Sulfate (D))

The liquid crystal polymer composition according to the present invention may contain, if necessary, barium sulfate (D) (hereinafter, referred to also as the "component (D)"). The component (D) is classified into: ground barium sulfate (barite powder) obtained by grinding a mineral called barite, deironing the ground product, and elutriating it; and precipitated barium sulfate obtained by artificial synthesis. Precipitated barium sulfate can be controlled in particle size depending on conditions during synthesis. Thus, desired fine barium sulfate particles including a small content of coarse particles can be produced. From the viewpoint of further reducing impurities and further homogenizing the particle size distribution of barium sulfate, precipitated barium sulfate is preferably used.

The component (D) is preferably in powder form and its average particle diameter is preferably 0.1 μm to 50 μm, more preferably 0.1 μm to 30 μm, still more preferably 0.1 μm to 5 μm, yet still more preferably 0.3 μm to 1.2 μm, particularly preferably 0.3 μm to 0.8 μm, and most preferably 0.3 μm to 0.5 μm. By defining the average particle diameter within the above range, the coefficient of friction during sliding can be further decreased.

The average particle diameter of the component (D) can be measured by the laser diffraction and scattering method and is a particle diameter at a volume-based cumulative integrated value of 50% in a particle size distribution measured by the laser diffraction and scattering method (a volume-based 50% cumulative particle diameter), i.e., $D_{50}$ (a median diameter). This volume-based 50% cumulative particle diameter ($D_{50}$) is a particle diameter at a cumulative value of 50% in a cumulative curve of a particle size distribution determined on a volume basis, the cumulative curve assuming the total volume of particles to be 100%, where during accumulation the number of particles is counted from a smaller size side.

The particle shape of the component (D) is not particularly limited so long as the component (D) is non-fibrous particles, such as spherical, prismoidal, platy, rodlike, columnar, blocky or amorphous particles, but a spherical or amorphous shape is preferred. The particle shape of barium sulfate can be analyzed, for example, by observation with a scanning electron microscope (SEM). The component (D) may be subjected to surface treatment. Examples of the treatment agent include a coating agent, a dispersant, and a modifier and specific examples include fatty acids, waxes, non-ionic surfactants, epoxy-based compounds, isocyanate-based compounds, silane-based compounds, titanate-based compounds, phosphorus-based compounds, aluminates, such as alumina, silicates, such as silicon dioxide, titanates, such as titanium dioxide. These treatment agents may be used singly or in combination of two or more of them.

The content of the component (D) in the liquid crystal polymer composition according to the present invention is, in a total amount of 100% by mass of the liquid crystal polymer composition, preferably 1% by mass to 30% by mass, more preferably 1% by mass to 20% by mass, still more preferably 1% by mass to 15% by mass, and most preferably 1.5% by mass to 2.5% by mass. By defining the content of the component (D) within the range of 1% by mass to 30% by mass, the production of particles can be further reduced.

(Solid Lubricant)

A solid lubricant may be blended into the liquid crystal polymer composition according to the present invention without impairing the preferred physical properties of the liquid crystal polymer composition. Examples of the solid lubricant include low-density polyethylene, linear low-density polyethylene, medium-density polyethylene, high-density polyethylene, ultra-high molecular weight polyethylene or other polyolefin resins, silicone resin, graphite, molybdenum disulfide, tungsten disulfide, boron nitride, polytetrafluoroethylene resin which is a polymer having repeating units of —($CF_2$—$CF_2$)—, and a modified polytetrafluoroethylene resin into which a perfluoroalkyl ether group (—$C_pF_{2p}$—O—) (where p is an integer of 1 to 4) or a polyfluoroalkyl group (H($CF_2$)q) (where q is an integer of 1 to 20) is introduced. At least one of these solid lubricants may be blended into the liquid crystal polymer composition. The content of the solid lubricant in the liquid crystal polymer composition according to the present invention is, in a total amount of 100% by mass of the liquid crystal polymer composition, preferably 0.5% by mass to 20% by mass and more preferably 1% by mass to 15% by mass.

(Other Additives)

The liquid crystal polymer composition according to the present invention may contain other additives without impairing its preferred physical properties. Examples of the other additives include: an inorganic filler (for example, calcium carbonate, mica, sericite, illite, talc, kaolinite, montmorillonite, boehmite, smectite, vermiculite, palygorskite, pyrophyllite, halloysite, diatomite, titanium dioxide); a laser direct structuring additive (for example, $MgAl_2O_4$, $ZnAl_2O_4$, $FeAl_2O_4$, $CuFe_2O_4$, $MnFe_2O_4$, $NiFe_2O_4$, $TiFe_2O_4$, $FeCr_2O_4$ or $MgCr_2O_4$); a conductive filler (for example, metallic particles (for example, aluminum flake), metallic fibers, metal oxide particles, carbon fibers, ionic liquid or surfactant); an antistat (for example, anionic antistat, cationic antistat or non-ionic antistat); an antioxidant and a thermal stabilizer (for example, hindered phenol, hydroquinone, phosphite or substitutions of these substances); a ultraviolet ray absorber (for example, resorcinol, salicylate, benzotriazole, benzophenone or triazine); a light stabilizer (for example, hindered phenol); a weatherproofer; a light-resistant agent; a mold release agent (for example, higher fatty acid, higher fatty acid ester, higher fatty acid amide, metal salt of higher fatty acid (higher fatty acid used herein refers to fatty acid with 10 to 25 carbon atoms), fatty acid or metal salt of fatty acid); a lubricant; a flow modifier; a plasticizer (for example, polyester-based plasticizer, glycerin-based plasticizer, polycarboxylic acid ester-based plasticizer, phosphoric acid ester-based plasticizer, polyalkylene glycol-based plasticizer or epoxy-based plasticizer); an impact resistance improver; a flame retardant (for example, phosphazene-based compound, phosphoric acid ester, condensed phosphoric acid ester, inorganic phosphorous flame retardant, halogen-based flame retardant, silicone-based flame retardant, metal oxide-based flame retardant, metal hydroxide-based flame retardant, organometallic salt-based flame retardant, nitrogen-based flame retardant or boron compound-based flame retardant); an antidripping agent; a nucleating agent; a dispersant; a sound deadener; a neutralizer; and an antiblocking agent. The liquid crystal polymer composition may contain at least one of these additives.

In the case where the liquid crystal polymer composition according to the present invention contains the other additives, the content of them is not particularly limited unless it impairs the preferred physical properties of the liquid crystal polymer composition. The content of the other additives is, in a total amount of 100% by mass of the liquid crystal polymer composition, 10% by mass or less and preferably 5% by mass or less.

<Production Method of Liquid Crystal Polymer Composition>

A liquid crystal polymer composition according to the present invention contains a liquid crystal polymer (A), a particulate carbon material (B), and a reinforcing material (C), further contains, if necessary, barium sulfate (D), a solid lubricant, and other additives, and can be produced by heating and mixing (particularly, melt-kneading) a mixture containing these components.

For melt-kneading, any known melt kneader, for example, a biaxial extruder, can be used. Specifically, the liquid crystal polymer composition can be produced by: (1) a method of preliminarily mixing the components with a mixer (such as a tumbler or a Henschel mixer), melt-kneading the mixture with a melt kneader, and then pelletizing it with a pelletization device (such as a pelletizer); (2) a method of controlling a master batch of desired components, mixing it with other components as necessary, and melt-kneading the mixture into pellets with a melt kneader; (3) a method of feeding the components into a melt kneader to form pellets; or other methods.

The processing temperature during melt-kneading is not particularly limited so long as it is within a temperature range in which the liquid crystal polymer (A) can melt. Normally, the cylinder temperature of a melt kneader for use in the melt-kneading is adjusted within this range. Thus, the liquid crystal polymer composition according to the present invention that can exhibit desired effects is produced.

<Production Method and Use of Liquid Crystal Polymer Molded Body>

The liquid crystal polymer composition according to the present invention can be produced into a liquid crystal polymer molded body by molding it according to a known resin molding method, such as injection molding, insert molding, compression molding, blow molding or inflation molding depending on the type, use, shape, and others of a desired liquid crystal polymer molded body and is preferably produced by injection molding or insert molding. Alternatively, a molding method composed of any combination of the above molding methods may be adopted. The liquid crystal polymer molded body obtained by molding the liquid crystal polymer composition according to the present invention has excellent light-blocking properties and excellent mechanical strength, particularly such as shock resistance. In addition, the liquid crystal polymer molded body has excellent antistatic properties and can reduce particles that may be produced in impact and fall events.

The liquid crystal polymer molded body molded using the liquid crystal polymer composition according to the present invention is suitably used as a member for use in producing electronic components of precision equipment. The liquid crystal polymer molded body is suitably used for production of a component including the liquid crystal polymer molded body and examples of the component include electronic components for sliding members sliding on other members, for example, components constituting one selected from the group consisting of a connector, an antenna, a switch, a relay, and a camera module. The liquid crystal polymer molded body according to the present invention is suitably used for production of, among the above electronic components, particularly electronic optical components (components for a camera module) being constituents of a camera module because it can be expected to prevent the reduction in optical properties due to fibrillation of the surface of the liquid crystal polymer molded body. Examples of electronic optical components being constituents of a camera module include a lens barrel (a portion on which a lens is mounted), a spacer, amount holder (a portion on which the barrel is attached and which is fixed to a substrate), a base, a lens tube, a frame of a CMOS (an image sensor), a shutter, a shutter plate, a shutter body, an aperture ring, and a stopper (a portion holding a lens).

Electrical and electronic equipment according to the present invention includes the above-described liquid crystal polymer molded body and has a camera function. Particularly, the electrical and electronic equipment according to the present invention can be suitably used as a smartphone or a tablet terminal having a camera function.

EXAMPLES

Hereinafter, a detailed description will be given of the present invention with reference to working examples and comparative examples, but the present invention is not at all limited to these examples. Specific raw materials used in the working examples and comparative examples are as follows.

Liquid crystal polymer 1: melt viscosity of $2.4 \times 10^4$ mPa·s, melting point of 280° C., trade name "UENO LCP A-5000" manufactured by Ueno Fine Chemicals Industry, Ltd.

Liquid crystal polymer 2: melt viscosity of $2.0 \times 10^4$ mPa·s, melting point of 320° C., trade name "UENO LCP A-6000" manufactured by Ueno Fine Chemicals Industry, Ltd.

Carbon black (CB): primary particle diameter of 24 nm, BET specific surface area of 110 $m^2/g$, DBP oil absorption of 95 $cm^3/100$ g, trade name "MA100RB" manufactured by Mitsubishi Chemical Corporation Wollastonite fibers: average fiber length of 9.3 μm, average fiber diameter of 2.4 μm, aspect ratio of 3.9

Potassium titanate fibers: average fiber length of 15 μm, average fiber diameter of 0.5 μm, trade name "TISMO N" manufactured by Otsuka Chemical Co., Ltd.

Barium sulfate: average particle diameter of 0.28 μm, trade name "Precipitated Barium Sulfate B-31" manufactured by Sakai Chemical Industry Co., Ltd.

Talc: average particle diameter ($D_{50}$) of 19 μm, trade name "RG319" manufactured by Fuji Talc Industrial Co., Ltd.

The melt viscosity of the liquid crystal polymer was measured with a melt viscosity measurement device (trade name "Capilograph 1D" manufactured by Toyo Seiki Seisaku-sho, Ltd.) using a capillary rheometer with 1.0 mm in diameter and 10 mm in length under conditions of a shear rate of $1.0 \times 10^3$ $sec^{-1}$ measured at a temperature 40° C. higher than the melting point as for the liquid crystal polymer land at a temperature 30° C. higher than the melting point as for the liquid crystal polymer 2. The primary particle diameter of carbon black was determined from an arithmetic average particle diameter (number average) which is an average value of primary particle diameters measured by a transmission electron microscope (product number "JEM2010" manufactured by JEOL Ltd.). The DBP oil absorption was measured with a dibutyl phthalate absorbed meter in conformity with JIS K 6221. The BET specific surface area was measured in conformity with JIS K 6217.

Each of the average fiber length, average fiber diameter, and aspect ratio of the wollastonite fibers or potassium titanate fibers was determined from the average value of arbitrary 1000 fibers measured by observation with a scanning electron microscope. The average particle diameter was measured with a laser diffraction particle size distribution measurement device (trade name "SALD-2100" manufactured by Shimadzu Corporation).

<Production of Liquid Crystal Polymer Composition and Liquid Crystal Polymer Molded Body>

Composition Examples 1 to 8 and Comparative Composition Examples 1 to 4

Each liquid crystal polymer composition was melt-kneaded in the composition ratio shown in Table 1 using a biaxial extruder, thus producing pellets. The cylinder temperature of the biaxial extruder was 300° C.

In Composition Example 1, use was made of a reinforcing material (wollastonite fibers A) obtained by loading wollastonite fibers into a Henschel mixer and subjecting the wollastonite fibers to surface treatment by the dry method so that the wollastonite fibers were treated with 1.0% by mass octyltriethoxysilane (the number of carbon atoms of the alkyl group: 8) relative to the wollastonite fibers. In Composition Examples 2, 4, and 5, use was made of a reinforcing material (wollastonite fibers B) obtained by loading wollastonite fibers into a Henschel mixer and subjecting the wollastonite fibers to surface treatment by the dry method so that the wollastonite fibers were treated with 1.0% by mass decyltrimethoxysilane (the number of carbon atoms of the alkyl group: 10) relative to the wollastonite fibers. In Composition Example 3, use was made of a reinforcing material (wollastonite fibers C) obtained by loading wollastonite fibers into a Henschel mixer and subjecting the wollastonite fibers to surface treatment by the dry method so that the wollastonite fibers were treated with 1.0% by mass hexadecyltrimethoxysilane (the number of carbon atoms of the alkyl group: 16) relative to the wollastonite fibers. In Comparative Composition Example 3, use was made of a reinforcing material (wollastonite fibers D) obtained by loading wollastonite fibers into a Henschel mixer and subjecting the wollastonite fibers to surface treatment by the dry method so that the wollastonite fibers were treated with 1.0% by mass 3-aminopropyltriethoxysilane relative to the wollastonite fibers. In Comparative Composition Examples 1 and 2, wollastonite fibers (untreated wollastonite fibers) not subjected to surface treatment, i.e., untreated, were used as they were.

In Composition Examples 6 to 8, use was made of a reinforcing material (potassium titanate fibers A) obtained by loading potassium titanate fibers into a Henschel mixer and subjecting the potassium titanate fibers to surface treatment by the dry method so that the potassium titanate fibers were treated with 1.0% by mass decyltrimethoxysilane (the number of carbon atoms of the alkyl group: 10) relative to the potassium titanate fibers. In Comparative Composition Example 4, use was made of a reinforcing material (potassium titanate fibers B) obtained by loading potassium titanate fibers into a Henschel mixer and subjecting the potassium titanate fibers to surface treatment by the dry method so that the potassium titanate fibers were treated with 1.0% by mass γ-glycidoxypropyltrimethoxysilane relative to the potassium titanate fibers.

<Evaluations about Mechanical Properties of Liquid Crystal Polymer Molded Body>

Examples 1 to 8 and Comparative Examples 1 to 4

The pellets obtained in each of Composition Examples 1 to 8 and Comparative Composition Examples 1 to 4 were molded into flat plates (all with a length of 90 mm, a width of 50 mm, and a thickness of 3 mm) and JIS test specimens with an injection molder, and these molded pieces were used as evaluation samples (liquid crystal polymer molded bodies). The cylinder temperature of the injection molder was 310° C. and the molding tool temperature thereof was 120° C.

<Evaluations>
(Tensile Strength and Tensile Elongation)
The samples were measured in terms of tensile strength and tensile elongation with a tester Autograph AG-5000 (manufactured by Shimadzu Corporation) in conformity with JIS K 7162.
(Bending Strength, Bending Modulus of Elasticity, and Bending Deflection)
The samples were subjected to a 60 mm-span three-point bending test with a tester Autograph AG-5000 (manufactured by Shimadzu Corporation) in conformity with JIS K 7171 to measure their bending strengths, bending moduli of elasticity, and binding deflections. The results are shown in Table 1.
(Notched IZOD Impact Value)
The No. 2 test specimens were measured in conformity with JIS K 7110. The results are shown in Table 1.
(Hunter Brightness)
The Hunter brightness of each of the freshly molded flat plates was measured with a colorimeter (trade name: ZE 6000, manufactured by Nippon Denshoku Industries Co., Ltd.). The results are shown in Table 1.
(Mold Shrinkage)
The respective longitudinal dimensions of the JIS test specimens for tensile test measurements were accurately measured with a micrometer and the percentage of difference of the longitudinal dimension of each JIS test specimen from the associated dimension of the molding tool was referred to as the mold shrinkage (%). Specifically, the mold shrinkage (%) was calculated according to the formula (II).

Mold shrinkage (%)=[((tool dimension)−(molded part dimension))/(tool dimension)]×100     Formula (II)

(Coefficient of Friction)
Each of the flat plates underwent a test for sliding on a hard metal with a static friction tester (product number "TRIBOSTAR TS501" manufactured by Kyowa Interface Science Co., Ltd.) under conditions of a load of 50 g, a velocity of 1 mm/sec for a travel distance of 10 mm, the use of a stainless steel ball (SUS304 with a diameter of 3 mm), and 1000 cycles of sliding to measure the static coefficient of friction (μs) and dynamic coefficient of friction (μk) of the flat plate.

The results are shown in Table 1.

TABLE 1

| | | | | Examined Examples | | | | | |
|---|---|---|---|---|---|---|---|---|---|
| | Composition | | unit | Example 1 (CB 1.0%) Compos. Ex. 1 (CB 1.0%) | Example 2 (CB 1.0%) Compos. Ex. 2 (CB 1.0%) | Example 3 (CB 1.0%) Compos. Ex. 3 (CB 1.0%) | Example 4 (CB 2.0%) Compos. Ex. 4 (CB 2.0%) | Example 5 (CB 3.0%) Compos. Ex. 5 (CB 3.0%) | Example 6 (CB 1.0%) Compos. Ex. 6 (CB 1.0%) |
| Components | (A) LC polymer | LC polymer 1 | % by mass | 79.0 | 79.0 | 79.0 | 78.0 | 77.0 | 79.0 |
| | (B) Particulate CM | carbon black | | 1.0 | 1.0 | 1.0 | 2.0 | 3.0 | 1.0 |
| | (C) Reinforcing material | wollastonite fibers A | | 20.0 | | | | | |
| | | wollastonite fibers B | | | 20.0 | | 20.0 | 20.0 | |
| | | wollastonite fibers C | | | | 20.0 | | | |
| | | wollastonite fibers D | | | | | | | |
| | | untreated wollastonite fibers | | | | | | | |
| | | potassium titanate fibers A | | | | | | | 20.0 |
| | | potassium titanate fibers B | | | | | | | |

TABLE 1-continued

| Items for Physical Property Evaluation of LC Polymer Molded Body | | unit | | | | | | |
|---|---|---|---|---|---|---|---|---|
| tensile strength | | MPa | 155 | 175 | 165 | 172 | 183 | 226 |
| tensile elongation | | % | 7.0 | 9.0 | 8.3 | 9.1 | 9.6 | 10.3 |
| bending strength | | MPa | 164 | 157 | 162 | 158 | 159 | 177 |
| bending modulus of elasticity | | GPa | 9.2 | 8.8 | 9.2 | 9.1 | 9.2 | 10.5 |
| bending deflection | | % | 7.0 | 6.5 | 6.7 | 6.5 | 6.4 | 6.3 |
| IZOD impact value (notched) | | J/m | 288 | 385 | 383 | 446 | 560 | 628 |
| Hunter brightness | | — | 22.0 | 22.8 | 22.3 | 17.7 | 18.1 | 25.7 |
| mold shrinkage | | % | 0.1 | −0.1 | 0.1 | −0.1 | −0.1 | −0.1 |
| static coefficient of friction (μs) | | — | 0.48 | 0.40 | 0.11 | 0.45 | 0.15 | 0.26 |
| dynamic coefficient of friction (μk) | | — | 0.43 | 0.39 | 0.11 | 0.41 | 0.18 | 0.19 |

| | Composition | | unit | Example 7 (CB 2.0%) Compos. Ex. 7 (CB 2.0%) | Example 8 (CB 3.0%) Compos. Ex. 8 (CB 3.0%) | Comp. Ex. 1 (CB 0%) Comp. Compos. Ex. 1 (CB 0%) | Comp. Ex. 2 (CB 3.0%) Comp. Compos. Ex. 2 (CB 3.0%) | Comp. Ex. 3 (CB 3.0%) Comp. Compos. Ex. 3 (CB 3.0%) | Comp. Ex. 4 (CB 3.0%) Comp. Compos. Ex. 4 (CB 3.0%) |
|---|---|---|---|---|---|---|---|---|---|
| Components | (A) LC polymer | LC polymer 1 | % by mass | 78.0 | 77.0 | 80.0 | 77.0 | 77.0 | 77.0 |
| | (B) Particulate CM | carbon black | | 2.0 | 3.0 | 0 | 3.0 | 3.0 | 3.0 |
| | (C) Reinforcing material | wollastonite fibers A | | | | | | | |
| | | wollastonite fibers B | | | | | | | |
| | | wollastonite fibers C | | | | | | | |
| | | wollastonite fibers D | | | | | | 20.0 | |
| | | untreated wollastonite fibers | | | | 20.0 | 20.0 | | |
| | | potassium titanate fibers A | | 20.0 | 20.0 | | | | |
| | | potassium titanate fibers B | | | | | | | 20.0 |
| Items for Physical Property Evaluation of LC Polymer Molded Body | tensile strength | | MPa | 229 | 221 | 188 | 175 | 167 | 231 |
| | tensile elongation | | % | 10.4 | 10.4 | 8.3 | 6.6 | 5.7 | 7.4 |
| | bending strength | | MPa | 176 | 180 | 173 | 183 | 179 | 222 |
| | bending modulus of elasticity | | GPa | 10.5 | 10.7 | 8.7 | 9.2 | 9.4 | 11.2 |
| | bending deflection | | % | 6.4 | 6.4 | 6.5 | 6.4 | 5.2 | 5.8 |
| | IZOD impact value (notched) | | J/m | 667 | 689 | 224 | 196 | 208 | 220 |
| | Hunter brightness | | — | 19.9 | 16.5 | 79.8 | 14.6 | 15.3 | 18.2 |
| | mold shrinkage | | % | −0.1 | −0.1 | −0.1 | 0.0 | 0.0 | −0.1 |
| | static coefficient of friction (μs) | | — | 0.12 | 0.11 | 0.49 | 0.48 | 0.49 | 0.47 |
| | dynamic coefficient of friction (μk) | | — | 0.09 | 0.12 | 0.38 | 0.44 | 0.39 | 0.42 |

As is obvious from Table 1, it can be seen for Comparative Examples 1 and 2 that since the Hunter brightness of the liquid crystal polymer molded body in Comparative Example 1 was 79.8, but the Hunter brightness of the liquid crystal polymer molded body in Comparative Example 2 was reduced to 14.6, the light-blocking properties was improved by the addition of the particulate carbon material. However, as is obvious from Table 1, a comparison between Comparative Examples 1 and 2 shows that blending of a particulate carbon material and a reinforcing material (not subjected to surface treatment) slightly degraded the IZOD impact value (notched) of the liquid crystal polymer molded body, likely because of the effect of the brittleness of the particulate carbon material.

As is obvious from Table 1, it can be seen that, in Examples 1 to 3, with the use of a reinforcing material surface-treated with an alkyl-based, alkoxysilane coupling agent having a hydrophobic alkyl group with 8 or more carbon atoms, an excellent improvement effect on the IZOD impact value (notched) of the liquid crystal polymer molded body was achieved. A comparison between Example 5 and Comparative Example 2 shows that when the reinforcing material was surface treated with decyltrimethoxysilane having a hydrophobic alkyl group with 10 carbon atoms, this brought about, instead of deterioration in IZOD impact value (notched) of the molded body as compared to the case of the reinforcing material not subjected to surface treatment, an unexpected excellent improvement effect on the IZOD impact value (notched). A comparison between Example 5 and Comparative Example 3 and a comparison between Example 8 and Comparative Example 4 show that even with the use of a reinforcing material surface-treated with an alkyl-based, alkoxysilane coupling agent having no hydrophobic alkyl group with 8 or more carbon atoms, any improvement effect on the IZOD impact value (notched) of the liquid crystal polymer molded body was not found.

A comparison among Example 2, Example 4, and Example 5 or a comparison among Examples 6 to 8 shows that with a combination of the particulate carbon material and a reinforcing material surface-treated with an alkyl-based, alkoxysilane coupling agent having a hydrophobic alkyl group with 8 or more carbon atoms, a more excellent improvement effect on the IZOD impact value (notched) was achieved with increasing amount of particulate carbon material added.

A comparison among Example 2, Example 4, and Example 5 or a comparison among Examples 6 to 8 shows that with a combination of the particulate carbon material and a reinforcing material surface-treated with an alkyl-based, alkoxysilane coupling agent having a hydrophobic alkyl group, the dynamic coefficient of friction and the static coefficient of friction tend to be decreased with increasing amount of particulate carbon material added. A comparison among Examples 1 to 3 shows that with a combination of the particulate carbon material and a reinforcing material surface-treated with an alkyl-based, alkoxysilane coupling agent having a hydrophobic alkyl group, the dynamic coefficient of friction and/or the static coefficient of friction tend to be decreased with increasing number of carbon atoms of the alkyl group.

In relation to Example 6, Example 7, and Example 8, since the brightness of the liquid crystal polymer molded body in Example 6 was 25.7, but the Hunter brightness of the liquid crystal polymer molded body in Example 7 was reduced to 19.9, and the Hunter brightness of the liquid crystal polymer molded body in Example 8 was further reduced to 16.5, the Hunter brightness was reduced with increasing amount of particulate carbon material added. This shows that the light-blocking properties tend to be improved with increasing amount of particulate carbon material added.

As seen from the above, although heretofore the shock resistance has been decreased by adding a particulate carbon material into a liquid crystal polymer, a combination of the particulate carbon material and a reinforcing material having a treated layer made of a hydrophobic surface treatment agent brings about an unexpected effect of significantly increasing the shock resistance while maintaining the light-blocking properties. Particularly, it can be seen that by molding a liquid crystal polymer composition into which a particulate carbon material and a reinforcing material surface-treated with an alkyl-based, alkoxysilane coupling agent having a hydrophobic alkyl group with a large number of carbon atoms are blended, unexpected effects of tremendously increasing the shock resistance and lowering the dynamic coefficient of friction and/or the static coefficient of friction are achieved. In addition, it can be seen that with a combination of the particulate carbon material and a reinforcing material surface-treated with an alkyl-based, alkoxysilane coupling agent having a hydrophobic alkyl group, unexpected effects of tremendously increasing the shock resistance and lowering the dynamic coefficient of friction and/or the static coefficient of friction with increasing amount of the particulate carbon material added are achieved.

<Evaluation of Liquid Crystal Polymer Molded Body about Amount of Particles Produced>

Composition Example 9 and Comparative Composition Example 5

Each liquid crystal polymer composition was melt-kneaded in the composition ratio shown in Table 2 using a biaxial extruder, thus producing pellets. The cylinder temperature of the biaxial extruder was 345° C.

In Composition Example 9, use was made of a reinforcing material (wollastonite fibers C) obtained by loading wollastonite fibers into a Henschel mixer and subjecting the wollastonite fibers to surface treatment by the dry method so that the wollastonite fibers were treated with 1.0% by mass hexadecyltrimethoxysilane (the number of carbon atoms of the alkyl group: 16) relative to the wollastonite fibers. In Comparative Composition Example 5, wollastonite fibers (untreated wollastonite fibers) not subjected to surface treatment, i.e., untreated, were used as they were.

Example 9 and Comparative Example 5

The pellets obtained in each of Composition Example 9 and Comparative Composition Example 5 were molded into flat plates 1 (9 mm×9 mm×1 mm), flat plates 2 (126 mm×13 mm×1.6 mm), and JIS test specimens with an injection molder, and these molded pieces were used as evaluation samples (liquid crystal polymer molded bodies). The cylinder temperature of the injection molder was 340° C. and the molding tool temperature thereof was 120° C.

(Amount of Particles Produced)

Twenty flat plates 1 were measured in terms of weight and then loaded into a container (made of SUS) with a length of 40 mm and an inside diameter of 18 mm and the container was placed in a vibrator (evaluation equipment: "JFC-400" manufactured by Japan Analytical Industry Co., Ltd.) and vibrated therein at 60 Hz for five minutes. After the end of the vibration, the particles adhering to the flat plates 1 were removed and, then, all the flat plates 1 were picked up from the container and measured in terms of weight. The difference in weight of each flat plate 1 between before and after the vibration test was calculated as the amount of particles produced. The results are shown in Table 2.

(Evaluation of Liquid Crystal Polymer Molded Body about Adhesion Properties)

(Measurement of Adhesion Force by Rivet Method)

Each of the tensile test specimens (dumbbell specimens) conforming to JIS was dried in a forced convection oven at 120° C. for 60 minutes. After the drying, a portion of the test specimen to be tested was wiped with a solvent to degrease the test specimen well. A SUS T-headed rivet (with a major diameter of 5.9 mm, a minor diameter of 3.0 mm, and a length of 13.3 mm) was immersed into a solvent to remove oil. An appropriate amount of adhesive agent was applied to the surface of a portion of the rivet with a major diameter of 5.9 mm and the rivet was bonded to a portion of the tensile test specimen (dumbbell specimen) to be held by a chuck. After the bonding, the adhesive agent was cured for 60 minutes in an oven previously conditioned at 80° C. After the curing, the adhesive agent considerably spreading out of the bonding surface was removed with a cutter or the like in advance. After being conditioned, the test specimen was attached to a digital force gauge, product number "ZTA-500N", manufactured by IMADA Co., Ltd., the SUS rivet was pushed at a rate of 10 mm/min, and the resulting test force (N) was defined as the adhesion strength. The test was conducted five times and the average of the five resulting values was indicated as the average adhesion strength in Table 2. The adhesive agent, curing conditions, and measurement instrument used are as follows.

Adhesive agent: low-elasticity, fast-curing epoxy adhesive agent, product number "AE-740", manufactured by Ajinomoto Fine-Techno Co., Inc.

Curing conditions: 80° C.×60 minutes Adhesive layer: tensile test specimen (plastic dumbbell test specimen of liquid crystal polymer molded body) conforming to JIS versus metal rod (SUS), n=5

Measurement Instrument: digital force gauge, product number "ZTA-500N", manufactured by IMADA Co., Ltd.

(Measurement of Tensile Adhesion Strength)

Each of the flat plates 2 was dried in a forced convection oven under conditions at 120° C. for 60 minutes. After the drying, a portion of the flat plate 2 to be tested was wiped with a solvent to degrease the flat plate 2 well. An adhesive agent (low-elasticity, fast-curing epoxy adhesive agent, product number "AE-740", manufactured by Ajinomoto Fine-Techno Co., Inc.) was applied to a portion of the test specimen (a portion of a surface thereof attached to the molding tool) 20 mm distant from a distal end thereof on the opposite side to the mold gate, portions of 20 mm length of the surface attached to the molding tool were overlapped and bonded together, fixed by a clip, and cured for 60 minutes in this state in an oven previously conditioned at 80° C. After the curing, the adhesive agent considerably spreading out of the bonding surface was removed with a cutter or the like in advance. After being conditioned, the test specimen underwent a tensile test at a rate of 10 mm/min with a tester Autograph, product number "AG-I", manufactured by Shimadzu Corporation and the resulting test force (N) was defined as the adhesion strength. The test was conducted 5 times and the average of the five resulting values was indicated as the average adhesion strength (tensile adhesion force) in Table 2. The adhesive agent, curing conditions, and measurement instrument used are as follows.

Adhesive agent: low-elasticity, fast-curing epoxy adhesive agent, product number "AE-740", manufactured by Ajinomoto Fine-Techno Co., Inc.
Curing conditions: 80° C.×60 minutes
Adhesive layer: test specimen of liquid crystal polymer molded body, 20 mm×13 mm
Measurement Instrument: Autograph, product number "AG-I", manufactured by Shimadzu Corporation The results are shown in Table 2.

TABLE 2

| Examined Examples | | | unit | Example 9 (CB 1.0%) | Comp. Ex. 5 (CB 1.0%) |
|---|---|---|---|---|---|
| Composition | | | | Compos. Ex. 9 | Comp. Compos. Ex. 5 |
| Components | (A) LC polymer | LC polymer 2 | % by mas | 69.0 | 69.0 |
| | (B) Particulate CM | carbon black | | 1.0 | 1.0 |
| | (C) Reinforcing material | wollastonite fibers C | | 20.0 | |
| | | untreated wollastonite fibers | | | 20.0 |
| | Optional components | (D) barium sulfate | | 2.4 | 2.4 |
| | | talc | | 7.6 | 7.6 |
| Items for Physical Property Evaluation of LC Polymer Molded Body | amount of particles produced | | % | 0.63 | 0.66 |
| | adhesion force by rivet method | | N | 63.0 | 59.5 |
| | tensile adhesion force | | MPa | 23.0 | 18.0 |
| | static coefficient of friction (μs) | | — | 0.16 | 0.49 |
| | dynamic coefficient of friction (μk) | | — | 0.16 | 0.44 |

As is obvious from Table 2, it can be seen that since the liquid crystal polymer molded body obtained in Example 9 was obtained by molding using a reinforcing material surface-treated with hexadecyltrimethoxysilane having an alkyl group with 16 carbon atoms, which is a hydrophobic alkyl group with 8 or more carbon chains, it produced a slightly smaller amount of particles and was increased in adhesion force by the rivet method and tensile adhesion force, as compared to the liquid crystal polymer molded body molded using a reinforcing material not subjected to surface treatment as in Comparative Example 5.

Therefore, the liquid crystal polymer molded body made of the liquid crystal polymer composition according to the present invention can be suitably used in, for example, electronic optical components being constituents of a camera module.

The invention claimed is:

1. A liquid crystal polymer composition comprising a liquid crystal polymer (A), a particulate carbon material (B), and a reinforcing material (C), wherein
the particulate carbon material (B) has a primary particle diameter of not less than 10 nm and not more than 50 nm, and
wherein a surface of the reinforcing material (C) comprises a a hydrophobic surface treatment agent.

2. The liquid crystal polymer composition according to claim 1, wherein the surface treatment agent is alkoxysilane represented by the general formula (I) below:

$$R^1_n Si(OR^2)_{4-n} \quad \text{Formula (I)}$$

wherein in the general formula (I) n represents an arbitrary integer selected from 1 to 3, $R^1$ represents an alkyl group, an alkenyl group or an aryl group, and $R^2$ represents an alkyl group.

3. The liquid crystal polymer composition according to claim 1, wherein the reinforcing material (C) has an average fiber length of 1 μm to 300 μm.

4. The liquid crystal polymer composition according to claim 1, wherein the reinforcing material (C) is at least one type of fibers selected from potassium titanate fibers and wollastonite fibers.

5. The liquid crystal polymer composition according to claim 1, wherein the particulate carbon material (B) is at least one of carbon black and carbon nanotube.

6. The liquid crystal polymer composition according to claim 1, wherein a mass ratio of the particulate carbon material (B) to the reinforcing material (C) (particulate carbon material (B)/reinforcing material (C)) is 1/400 to 10.

7. The liquid crystal polymer composition according to claim 1, wherein the liquid crystal polymer (A) is liquid crystal polyester.

8. The liquid crystal polymer composition according to claim 1, being used in a camera module.

9. A liquid crystal polymer molded body being a molded body of the liquid crystal polymer composition according to claim 1.

10. The liquid crystal polymer molded body according to claim 9, being a component for a camera module.

11. Electrical and electronic equipment comprising the liquid crystal polymer molded body according to claim 9 and having a camera function.

12. The electrical and electronic equipment according to claim 11, being a smartphone or a tablet terminal each having the camera function.

* * * * *